(12) United States Patent
Hayami et al.

(10) Patent No.: US 12,524,881 B2
(45) Date of Patent: Jan. 13, 2026

(54) ENDOSCOPIC IMAGE PROCESSING APPARATUS, ENDOSCOPIC IMAGE PROCESSING METHOD, AND RECORDING MEDIUM

(71) Applicant: OLYMPUS CORPORATION, Tokyo (JP)

(72) Inventors: Takehito Hayami, Tokyo (JP); Yamato Kanda, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 901 days.

(21) Appl. No.: 17/355,545

(22) Filed: Jun. 23, 2021

(65) Prior Publication Data

US 2021/0327067 A1 Oct. 21, 2021

Related U.S. Application Data

(63) Continuation of application No. PCT/JP2018/048408, filed on Dec. 28, 2018.

(51) Int. Cl.
*G06T 7/00* (2017.01)
*A61B 1/00* (2006.01)

(52) U.S. Cl.
CPC ........ *G06T 7/0014* (2013.01); *A61B 1/00004* (2013.01); *A61B 1/000094* (2022.02);
(Continued)

(58) Field of Classification Search
CPC . G06T 2207/30096; G06T 2207/10068; G06T 7/0014; G06T 2207/30004;
(Continued)

(56) References Cited

U.S. PATENT DOCUMENTS 8,799,053 B1 * 8/2014 Goldberg ........... G06Q 30/0269
705/7.29
2006/0173358 A1 8/2006 Xie
(Continued)

FOREIGN PATENT DOCUMENTS

JP 2004-073488 A 3/2004
JP 2006-191989 A 7/2006
(Continued)

OTHER PUBLICATIONS

International Search Report dated Mar. 19, 20219 received in PCT/JP2018/048408.

*Primary Examiner* — Anh Tuan T Nguyen
*Assistant Examiner* — Li-Ting Song
(74) *Attorney, Agent, or Firm* — Scully, Scott, Murphy & Presser, P.C.

(57) ABSTRACT

An endoscopic image processing apparatus includes a processor. The processor performs processing for acquiring lesion information including information indicating a position of a lesion region included in an endoscopic image, determines whether the lesion region is included in the endoscopic image, and performs processing for generating a display image for displaying one or more marks in at least one of N mark display regions set as regions as many as a maximum display number of the one or more marks, and generating the one or more marks indicating in which reference region among a predetermined plurality of reference regions set in the endoscopic image a present position of the lesion region or a position of the lesion region immediately before the detection is interrupted is included and displaying the one or more marks in at least one of the N mark display regions.

19 Claims, 9 Drawing Sheets

(52) U.S. Cl.
CPC ..... *A61B 1/00045* (2013.01); *G06T 2207/10068* (2013.01); *G06T 2207/30096* (2013.01)

(58) Field of Classification Search
CPC ............ A61B 1/00045; A61B 1/00004; A61B 1/00–0009; A61B 1/000094; A61B 1/00002; A61B 1/00006; A61B 1/00009; G06V 10/25
See application file for complete search history.

(56) References Cited

U.S. PATENT DOCUMENTS

| | | |
|---|---|---|
| 2011/0254937 A1 | 10/2011 | Yoshino |
| 2015/0078615 A1* | 3/2015 | Staples, II ................ G06T 7/50 382/103 |
| 2016/0073927 A1* | 3/2016 | Akimoto ............ A61B 1/00194 600/109 |
| 2019/0037201 A1* | 1/2019 | Serizawa ............. G02B 21/365 |
| 2020/0037856 A1* | 2/2020 | Watanabe .......... A61B 1/00045 |
| 2020/0126223 A1* | 4/2020 | Kitamura ......... A61B 1/000096 |
| 2021/0012495 A1* | 1/2021 | Kamon .................. G16H 50/20 |
| 2021/0022586 A1* | 1/2021 | Mori ...................... A61B 1/045 |
| 2021/0106208 A1* | 4/2021 | Iwaki ................. A61B 1/00045 |
| 2021/0110915 A1* | 4/2021 | Oosake ............. A61B 1/00055 |
| 2023/0014490 A1* | 1/2023 | Terliuc ............... A61B 1/00082 |

FOREIGN PATENT DOCUMENTS

| | | |
|---|---|---|
| JP | 2011-224038 A | 11/2011 |
| JP | 2013-255656 A | 12/2013 |
| WO | 2015/049962 A1 | 4/2015 |
| WO | 2018/198327 A1 | 11/2018 |
| WO | WO-2019106712 A1 * | 6/2019 |

* cited by examiner

ENDOSCOPIC IMAGE PROCESSING APPARATUS, ENDOSCOPIC IMAGE PROCESSING METHOD, AND RECORDING MEDIUM

CROSS REFERENCE TO RELATED APPLICATION

This application is a continuation application of PCT/JP2018/048408 filed on Dec. 28, 2018, the entire contents of which are incorporated herein by this reference.

BACKGROUND OF THE INVENTION

1. Field of the Invention

The present invention relates to an endoscopic image processing apparatus, an endoscopic image processing method, and a recording medium.

2. Description of the Related Art

In a medical field, there has been known a technique for detecting a lesioned part from an image obtained by picking up an image of a desired part of a subject and adding information concerning the detected lesioned part to the image and displaying the information.

More specifically, for example, Japanese Patent Application Laid-Open Publication No. 2004-73488 discloses a technique for detecting a lesioned part from an X-ray image obtained by picking up an image of a chest of a subject and displaying, in an outer frame portion of a diagnostic image corresponding to the X-ray image, a mark capable of specifying a position of the detected lesioned part.

In an endoscopic observation in the medical field, an elongated insertion section provided in an endoscope is inserted into an inside of an examinee, an image of an object in an observation visual field specified by an optical element or the like provided at a distal end portion of the insertion section is picked up, and an image obtained by picking up an image of the object is displayed on a display apparatus such as a monitor. In the endoscopic observation in the medical field, for example, according to a relative positional relation between a distal end portion of an insertion section inserted into an inside of an examinee and a lesioned part present on the inside of the examinee, a position of the lesioned part in an image obtained by picking up an image of an object on the inside of the examinee changes.

SUMMARY OF THE INVENTION

An endoscopic image processing apparatus according to an aspect of the present invention includes a processor. The processor: performs processing for detecting a lesion region equivalent to a region estimated as including a lesioned part in an endoscopic image obtained by picking up an image of an object in a subject with an endoscope and performs processing for acquiring lesion information including information indicating a position of the lesion region included in the endoscopic image; determines whether the lesion region is included in the endoscopic image; performs processing for generating, based on the lesion information and an obtained result of the determination, one or more marks indicating an overview of a detection state of the lesion region and performs processing for generating a display image for displaying the endoscopic image in an endoscopic image display region set on a display screen of a display apparatus and displaying the one or more marks in at least one of N mark display regions set in a predetermined position outside the endoscopic image display region on the display screen and set as regions as many as a maximum display number of the one or more marks; and performs processing for generating the one or more marks indicating in which reference region among a predetermined plurality of reference regions set in the endoscopic image a present position of the lesion region or a position of the lesion region immediately before the detection is interrupted is included and displaying the one or more marks in at least one of the N mark display regions.

An endoscopic image processing method according to an aspect of the present invention is an endoscopic image processing method including: performing processing for detecting a lesion region equivalent to a region estimated as including a lesioned part in an endoscopic image obtained by picking up an image of an object in a subject with an endoscope and performing processing for acquiring lesion information including information indicating a position of the lesion region included in the endoscopic image: determining whether the lesion region is included in the endoscopic image; performing processing for generating, based on the lesion information and an obtained result of the determination, one or more marks indicating an overview of a detection state of the lesion region; and performing processing for generating a display image for displaying the endoscopic image in an endoscopic image display region set on a display screen of a display apparatus and displaying the one or more marks in at least one of N mark display regions set in predetermined positions outside the endoscopic image display region on the display screen and set as regions as many as a maximum display number of the one or more marks, the endoscopic image processing method performing processing for generating the one or more marks indicating in which reference region among a predetermined plurality of reference regions set in the endoscopic image a present position of the lesion region or a position of the lesion region immediately before the detection is interrupted is included and displaying the one or more marks in at least one of the N mark display regions.

A computer-readable non-transitory recording medium recording an endoscopic image processing program according to an aspect of the present invention is a recording medium for causing a computer to execute: processing for detecting a lesion region equivalent to a region estimated as including a lesioned part in an endoscopic image obtained by picking up an image of an object in a subject with an endoscope; processing for acquiring lesion information including information indicating a position of the lesion region included in the endoscopic image; determination processing for determining whether the lesion region is included in the endoscopic image; processing for generating, based on the lesion information and a determination result obtained by the determination processing, one or more marks indicating an overview of a detection state of the lesion region; and processing for generating a display image for displaying the endoscopic image in an endoscopic image display region set on a display screen of a display apparatus and displaying the one or more marks in at least one of N mark display regions set in predetermined positions outside the endoscopic image display region on the display screen and set as regions as many as a maximum display number of the one or more marks. The processing for generating the display image is processing for generating the one or more marks indicating in which reference region among a predetermined plurality of reference regions set in the endoscopic image a present position of the lesion region or a position of the lesion region immediately before the detection is interrupted is included and displaying the one or more marks in at least one of the N mark display regions.

DETAILED DESCRIPTION OF THE PREFERRED EMBODIMENTS

Embodiments of the present invention are explained below with reference to the drawings.

First Embodiment

FIG. 1 to FIG. 8 relate to a first embodiment.

Figure 1:
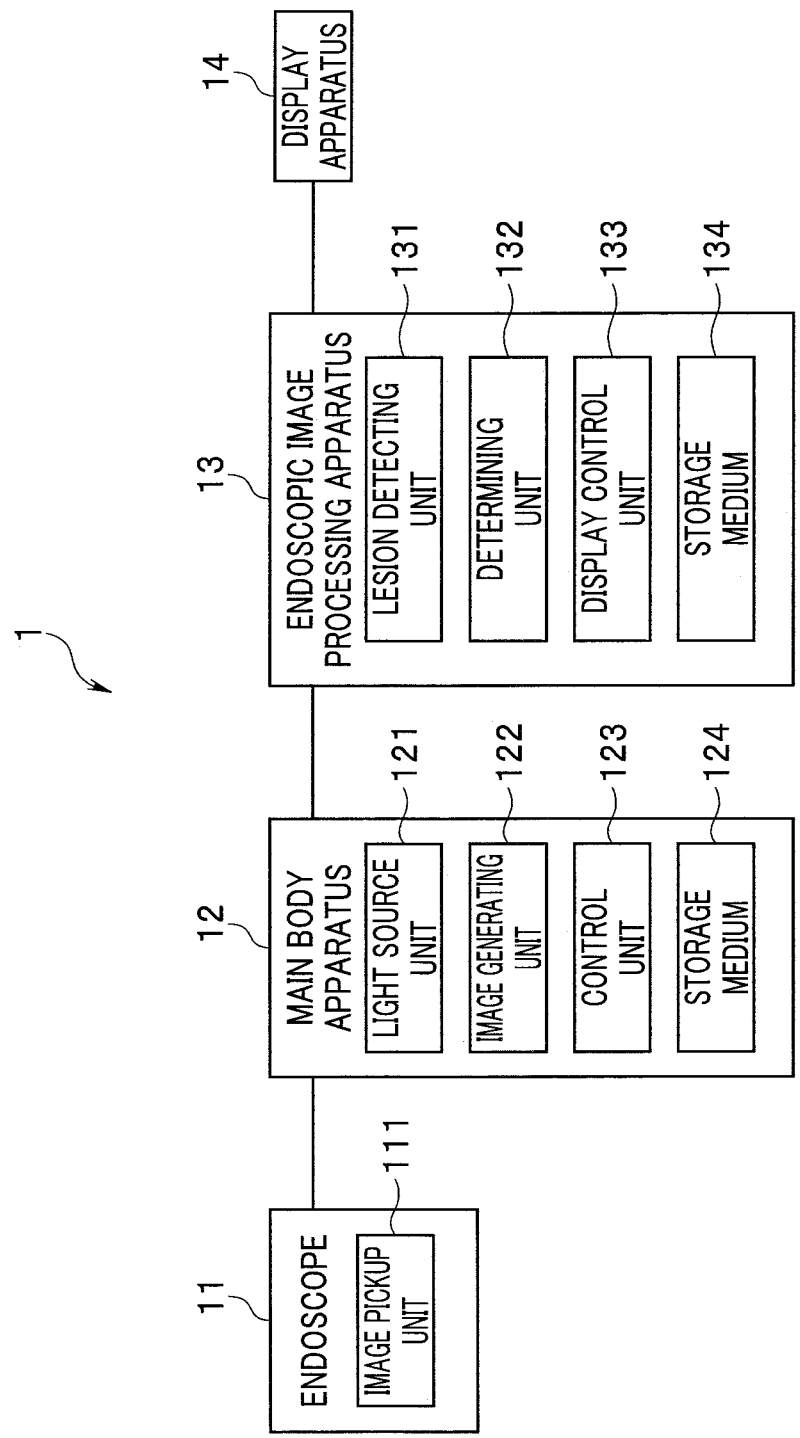
FIG. 1 is a diagram showing a configuration of a main part of an endoscope system including an endoscopic image processing apparatus according to a first embodiment.

An endoscope system 1 includes, as shown in FIG. 1, an endoscope 11, a main body apparatus 12, an endoscopic image processing apparatus 13, and a display apparatus 14. FIG. 1 is a diagram showing a configuration of a main part of an endoscope system including an endoscopic image processing apparatus according to the first embodiment.

The endoscope 11 includes, for example, an insertion section (not shown) having an elongated shape insertable into a subject and an operation section (not shown) provided in a proximal end portion of the insertion section. The endoscope 11 is configured to be removably connected to the main body apparatus 12 via, for example, a universal cable (not shown) extending from the operation section. Inside the endoscope 11, for example, a light guide member (not shown) such as an optical fiber for guiding illumination light supplied from the main body apparatus 12 and emitting the illumination light from a distal end portion of the insertion section is provided. An image pickup unit 111 is provided at the distal end portion of the insertion section of the endoscope 11.

The image pickup unit 111 includes an image pickup device such as a CCD image sensor or a CMOS image sensor. The image pickup unit 111 is configured to pick up an image of return light from an object illuminated by the illumination light emitted through the distal end portion of the insertion section of the endoscope 11, generate an image pickup signal corresponding to the return light, the image of which is picked up, and output the image pickup signal to the main body apparatus 12.

The main body apparatus 12 is configured to be removably connected to each of the endoscope 11 and the endoscopic image processing apparatus 13. The main body apparatus 12 includes, for example, as shown in FIG. 1, a light source unit 121, an image generating unit 122, a control unit 123, and a storage medium 124.

The light source unit 121 includes one or more light emitting elements such as LEDs. More specifically, the light source unit 121 includes, for example, a blue LED that generates blue light (hereinafter referred to as B light as well), a green LED that generates green light (hereinafter referred to as G light as well), and a red LED that generates red light (hereinafter referred to as R light as well). The light source unit 121 is configured to be able to generate illumination light corresponding to control by the control unit 123 and supply the illumination light to the endoscope 11.

The image generating unit 122 is configured to be able to generate an endoscopic image based on the image pickup signal outputted from the endoscope 11 and sequentially output the generated endoscopic image to the endoscopic image processing apparatus 13 frame by frame.

In the present embodiment, the image generating unit 122 and the control unit 123 of the main body apparatus 12 may be configured as individual electronic circuits or may be configured as circuit blocks in an integrated circuit such as an FPGA (Field Programmable Gate Array). In the present embodiment, for example, the main body apparatus 12 may include one or more processors (CPUs or the like). By modifying a configuration according to the present embodiment as appropriate, for example, the main body apparatus 12 may be configured to read, from the storage medium 124 such as a memory, a program for executing functions of the image generating unit 122 and the control unit 123 and perform operation corresponding to the read program.

The endoscopic image processing apparatus 13 is configured to be removably connected to each of the main body apparatus 12 and the display apparatus 14. The endoscopic image processing apparatus 13 is configured to perform processing based on an endoscopic image outputted from the main body apparatus 12 to thereby generate one or more marks indicating an overview of a detection state of a lesion region in the endoscopic image. The endoscopic image processing apparatus 13 is configured to be able to generate a display image including the endoscopic image outputted from the main body apparatus 12 and the one or more marks generated as explained above and output the display image to the display apparatus 14. The endoscopic image processing apparatus 13 includes a lesion detecting unit 131, a determining unit 132, a display control unit 133, and a storage medium 134.

The lesion detecting unit 131 is configured to perform processing for detecting a lesion region L equivalent to a region estimated as including a lesioned part in the endoscopic image sequentially outputted from the main body apparatus 12 and perform processing for acquiring lesion information IL equivalent to information indicating the detected lesion region L.

Note that, in the present embodiment, it is assumed that the lesion region L is detected as, for example, a region including a polyp. In the present embodiment, it is assumed that the lesion information IL is acquired as, for example, information including information indicating a position (a pixel position) of the lesion region L included in the endoscopic image outputted from the main body apparatus 12 and information indicating a size (the number of pixels) of the lesion region L included in the endoscopic image.

The determining unit 132 is configured to determine, according to an acquisition state of the lesion information IL in the lesion detecting unit 131, whether the lesion region L is included in the endoscopic image outputted from the main body apparatus 12.

More specifically, for example, when the lesion detecting unit 131 detects that the lesion information IL is acquired, the determining unit 132 acquires a determination result indicating that the lesion region L is included in the endoscopic image outputted from the main body apparatus 12. For example, when the lesion detecting unit 131 detects that the lesion information IL is not acquired, the determining unit 132 acquires a determination result indicating that the lesion region L Is not included in the endoscopic image sequentially outputted from the main body apparatus 12.

The determining unit 132 includes a memory (not shown) for sequentially storing the lesion information IL obtained by the lesion detecting unit 131. The determining unit 132 is configured to perform processing for determining, based on the lesion information IL obtained by the lesion detecting unit 131, whether the detection of the lesion region L corresponding to the lesion information IL is interrupted.

More specifically, the determining unit 132 determines, for example, based on first lesion information obtained by the lesion detecting unit 131 and second lesion information stored in a memory one frame before the first lesion information, whether a first lesion region indicated by the first lesion information and a second lesion region indicated by the second lesion information are the same lesion region L. When succeeding in detecting that the first and second lesion regions are the same lesion region L, the determining unit 132 acquires a determination result indicating that the detection of the lesion region L is not interrupted. When failing in detecting that the first and second lesion regions are the same lesion region L, the determining unit 132 acquires a determination result indicating that the detection of the lesion region L is interrupted.

The display control unit 133 is configured to perform processing for setting an endoscopic image display region on a display screen of the display apparatus 14 and setting, in predetermined positions outside the endoscopic image display region on the display screen, N mark display regions as many as a maximum display number of marks explained below. In other words, the N mark display regions are set in the predetermined positions outside the endoscopic image display region on the display screen of the display apparatus 14 and set as regions as many as the maximum display number of marks explained below. Note that, according to the present embodiment, a value of the N may be set to any value as long as the value corresponds to the maximum display number of marks explained below.

The display control unit 133 is configured to perform processing for generating, based on the lesion information IL obtained by the lesion detecting unit 131 and the determination result obtained by the determining unit 132, one or more marks indicating an overview of a detection state of the lesion region L corresponding to the lesion information IL.

The display control unit 133 is configured to perform processing for generating and outputting a display image for displaying the endoscopic image outputted from the main body apparatus 12 in the endoscopic image display region and displaying the one or more marks generated as explained above in at least one of the N mark display regions. In other words, the display control unit 133 is configured to be able to generate a display image including the endoscopic image outputted from the main body apparatus 12 and the one or more marks generated as explained above and output the display image to the display apparatus 14.

In the present embodiment, the lesion detecting unit 131, the determining unit 132, and the display control unit 133 of the endoscopic image processing apparatus 13 may be configured as individual electronic circuits or may be configured as circuit blocks in an integrated circuit such as an FPGA (Field Programmable Gate Array). In the present embodiment, for example, the endoscopic image processing apparatus 13 may include one or more processors (CPUs or the like). By modifying a configuration according to the present embodiment as appropriate, for example, the endoscopic image processing apparatus 13 may be configured to read, from the storage medium 134 such as a memory, a program for executing functions of the lesion detecting unit 131, the determining unit 132, and the display control unit 133 and perform operation corresponding to the read program.

The display apparatus 14 is configured to be removably connected to the endoscopic image processing apparatus 13. The display apparatus 14 includes a monitor and is configured to be able to display a display image outputted from the endoscopic image processing apparatus 13.

Subsequently, action in the present embodiment is explained.

A user such as a surgeon connects the respective units of the endoscope system 1 and turns on a power supply and, thereafter, inserts the insertion section of the endoscope 11 into an inside of a subject and disposes the distal end portion of the insertion section in a position where an image of a desired object can be picked up inside the subject.

When a power supply of the main body apparatus 12 is turned on, the control unit 123 performs, on the light source unit 121, control for sequentially or simultaneously generating B light, G light, and R light as illumination light. According to such control by the control unit 123, the illumination light is supplied from the light source unit 121 to the endoscope 11. An image of return light from the object illuminated by the illumination light is picked up in the image pickup unit 111. An endoscopic image EG corresponding to an image pickup signal outputted from the image pickup unit 111 to the main body apparatus 12 is generated in the image generating unit 122. The generated endoscopic image EG is sequentially outputted to the endoscopic image processing apparatus 13 frame by frame.

Figure 2:
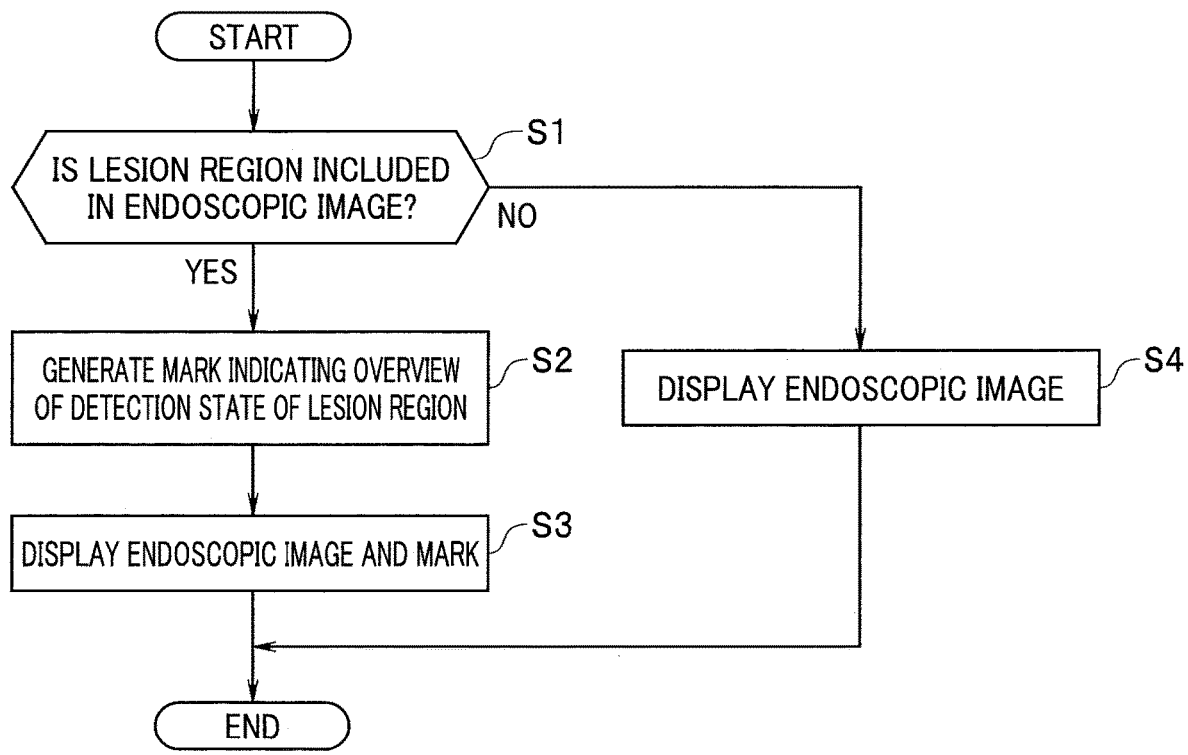
FIG. 2 is a flowchart for explaining processing performed in the endoscopic image processing apparatus according to the first embodiment.

A specific example of processing performed in the respective units of the endoscopic image processing apparatus 13 in the present embodiment is explained with reference to FIG. 2 and the like. FIG. 2 is a flowchart for explaining processing performed in the endoscopic image processing apparatus according to the first embodiment.

The lesion detecting unit 131 performs processing for detecting the lesion region L equivalent to a region estimated as including a lesioned part in the endoscopic image EG and performs processing for acquiring the lesion information IL equivalent to information indicating the detected lesion region L.

The display control unit 133 performs processing for setting an endoscopic image display region on a display screen of the display apparatus 14 and setting N mark display regions in predetermined positions outside the endoscopic image display region on the display screen.

Figure 3:
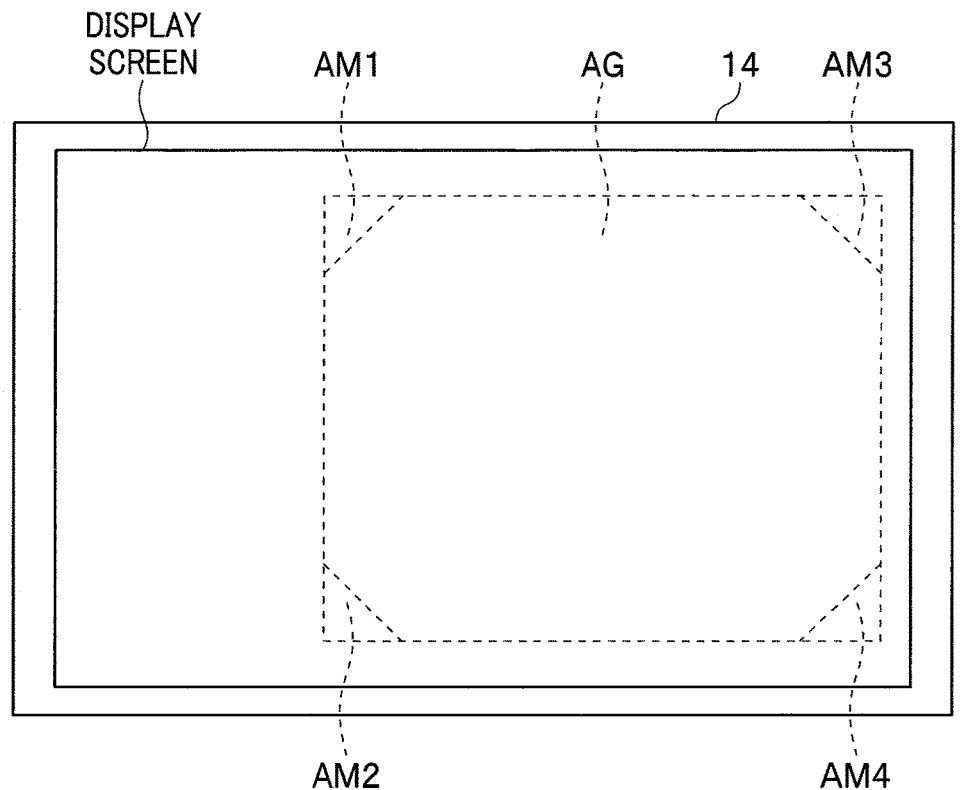
FIG. 3 is a diagram showing an example of an endoscopic image display region and mark display regions set on a display screen of a display apparatus.

More specifically, the display control unit 133 respectively sets, on the display screen of the display apparatus 14, for example, one endoscopic image display region AG and four mark display regions AM1, AM2, AM3, and AM4 shown in FIG. 3. FIG. 3 is a diagram showing an example of an endoscopic image display region and mark display regions set on a display screen of the display apparatus.

The endoscopic image display region AG is set as, for example, an octagonal region having the same size as a size of the endoscopic image EG or a size larger than the size of the endoscopic image EG (see FIG. 3). The mark display regions AM1 to AM4 are set as, for example, four triangular regions located outside the endoscopic image display region AG on the display screen of the display apparatus 14 and located in four directions of an upper left side, a lower left side, an upper right side, and a lower right side when viewed from a center of the endoscopic image display region AG (see FIG. 3). In other words, the mark display regions AM1 to AM4 are set in predetermined positions outside the endoscopic image display region AG and set as four regions as many as a maximum display number of marks in respective display examples explained below. Note that broken lines in the display screen shown in FIG. 3 are drawn to explain, for example, a positional relation between the endoscopic image display region AG and the mark display regions AM1 to AM4. Therefore, the broken lines are not actually displayed on the display apparatus 14.

The display control unit 133 performs processing for setting a predetermined plurality of reference regions in the endoscopic image EG.

Figure 4:
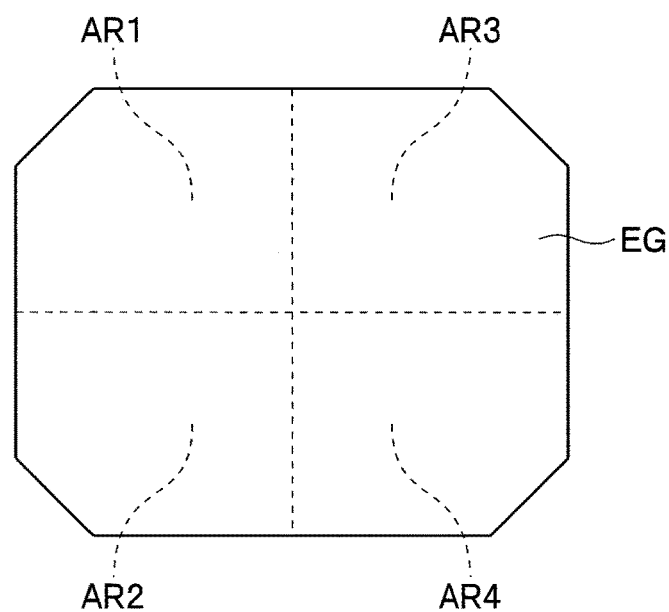
FIG. 4 is a diagram showing an example of a reference region set in an endoscopic image.

More specifically, the display control unit 133 sets, for example, four reference regions AR1, AR2, AR3, and AR4 equivalent to regions obtained by dividing the octagonal endoscopic image EG into respective parts of an upper left part, a lower left part, an upper right part, and a lower right part shown in FIG. 4. Note that, in FIG. 4, for convenience of illustration and explanation, drawing of an object such as the lesion region L included in the endoscopic image EG is omitted. FIG. 4 is a diagram showing an example of reference regions set in the endoscopic image.

According to the present embodiment, reference regions different in number from and/or having a shape different from the shape of the reference regions AR1 to AR4 illustrated in FIG. 4 may be set as long as the display control unit 133 sets a predetermined plurality of reference regions in the endoscopic image EG.

The determining unit 132 determines, according to an acquisition state of the lesion information IL in the lesion detecting unit 131, whether the lesion region L is included in the endoscopic image EG (step S1 in FIG. 2).

When a determination result indicating that the lesion region L is not included in the endoscopic image EG is obtained by the determining unit 132 (S1: NO), the display control unit 133 generates a display image for displaying the endoscopic image EG in the endoscopic image display region and outputs the display image to the display apparatus 14 (step S4 in FIG. 2) and, thereafter, ends a series of processing. In other words, in the present embodiment, when the lesion region L is not included in the endoscopic image EG, marks indicating an overview of a detection state of the lesion region L are not displayed in the mark display regions.

When a determination result indicating that the lesion region L is included in the endoscopic image EG is obtained by the determining unit 132 (S1: YES), the display control unit 133 performs processing for generating, based on the lesion information IL obtained by the lesion detecting unit 131 and a predetermined plurality of reference regions set in the endoscopic image EG, a mark indicating an overview of a detection state of the lesion region L corresponding to the lesion information IL (step S2 in FIG. 2).

The display control unit 133 generates a display image for displaying the endoscopic image EG in the endoscopic image display region and displaying the mark generated in step S2 in FIG. 2 in the mark display region and outputs the display image to the display apparatus 14 (step S3 in FIG. 2) and, thereafter, ends the series of processing.

According to the processing in step S2 and step S3 in FIG. 2, for example, a display image shown in any one of FIG. 5 to FIG. 8 is displayed on the display apparatus 14. FIG. 5 to FIG. 8 are diagrams showing examples of display images displayed according to processing of the endoscopic image processing apparatus according to the first embodiment.

Figure 5:
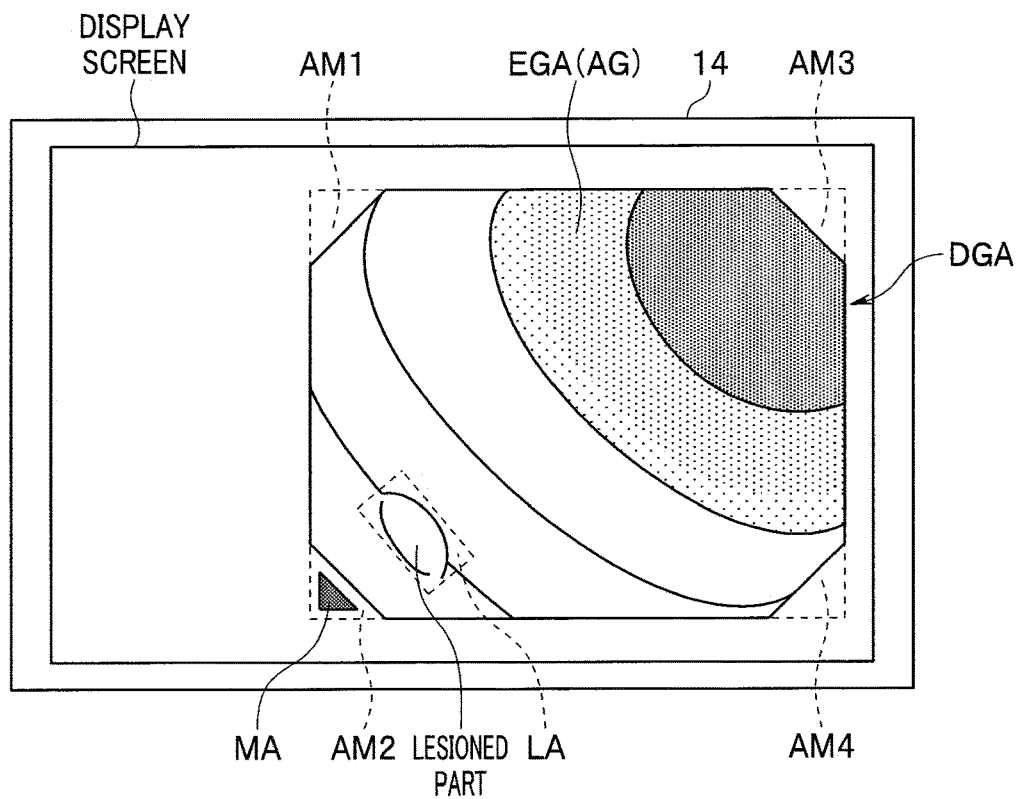
FIG. 5 is a diagram showing an example of a display image displayed according to the processing of the endoscopic image processing apparatus according to the first embodiment.

In an endoscopic image display region AG of a display image DGA shown in FIG. 5, an endoscopic image EGA having the same shape and the same size as a shape and a size of the endoscopic image display region AG is displayed. According to the endoscopic image EGA shown in FIG. 5, a lesion region LA is included the reference region AR2 (see FIG. 4) set in a lower left part of the endoscopic image EGA. Therefore, according to the display image DGA shown in FIG. 5, a mark MA indicating that the lesion region LA is detected in the reference region AR2 of the endoscopic image EGA is displayed in the mark display region AM2. Note that broken lines in the display screen shown in FIG. 5 are drawn to explain, for example, a positional relation between the lesion region LA and the mark display regions AM1 to AM4. Therefore, the broken lines are not actually displayed on the display apparatus 14.

According to a display example shown in FIG. 5, as the processing in step S2 in FIG. 2, processing for specifying that a present position of the lesion region LA is included in the reference region AR2 is performed by the display control unit 133. According to the display example shown in FIG. 5, as the processing in step S2 in FIG. 2, processing for generating the mark MA indicating that the lesion region LA is detected in the reference region AR2 of the endoscopic image EGA is performed by the display control unit 133. According to the display example shown in FIG. 5, as the processing in step S3 in FIG. 2, processing for generating the display image DGA including the endoscopic image EGA and the mark MA and causing the display apparatus 14 to display the display image DGA is performed by the display control unit 133.

In other words, according to the display example shown in FIG. 5, processing for specifying, based on the lesion information IL, one reference region AR2 including the present position of the lesion region LA among the predetermined plurality of reference regions, processing for generating one mark MA indicating the one reference region AR2, and processing for displaying the one mark MA in one mark display region AM2 set in a position closest to the one reference region AR2 among N mark display regions are performed by the display control unit 133.

Note that, according to the present embodiment, instead of the processing for displaying a mark in the mark display region AM2 corresponding to the reference region AR2 where the lesion region LA is detected being performed, for example, processing for displaying marks in the mark display regions AM1, AM3, and AM4 corresponding to the reference regions AR1, AR3, and AR4 where the lesion region LA is not detected may be performed.

According to the present embodiment, for example, when the lesion region LA has a size included in a plurality of reference regions in the reference regions AR1 to AR4, processing for displaying marks in respective mark display regions corresponding to the plurality of reference regions may be performed. More specifically, for example, when the lesion region LA is included in the reference regions AR1 and AR2, processing for displaying marks in the mark display regions AM1 and AM2 corresponding to the reference regions AR1 and AR2 may be performed by the display control unit 133.

According to the present embodiment, for example, when the lesion region LA has a size included in a plurality of reference regions in the reference regions AR1 to AR4, processing for displaying a mark in one mark display region corresponding to one reference region having a largest area including the lesion region L among the plurality of reference regions may be performed.

Figure 6:
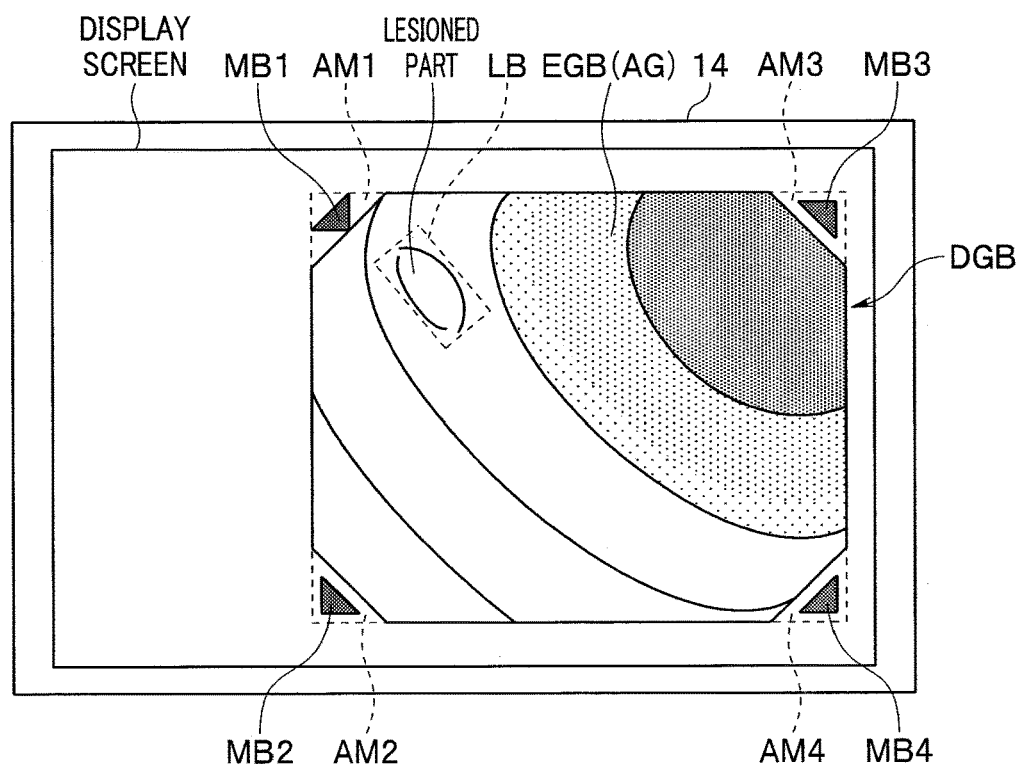
FIG. 6 is a diagram showing an example of a display image displayed according to the processing of the endoscopic image processing apparatus according to the first embodiment.

In an endoscopic image display region AG of a display image DGB shown in FIG. 6, an endoscopic image EGB having the same shape and the same size as a shape and a size of the endoscopic image display region AG is displayed. According to the endoscopic image EGB shown in FIG. 6, a lesion region LB is included in the reference region AR1 (see FIG. 4) set in an upper left part of the endoscopic image EGB. Therefore, according to the display image DGB shown in FIG. 6, four marks MB1, MB2, MB3, and MB4 indicating that the lesion region LB is detected in the endoscopic image EGB are displayed in the mark display regions AM1 to AM4. According to the display image DGB shown in FIG. 6, a mark MB1 having a shape indicating that the lesion region LB is detected in the reference region AR1 of the endoscopic image EGB is displayed. In other words, according to the display image DGB shown in FIG. 6, the mark MB1 having a triangular shape pointing at the reference region AR1 equivalent to a region where the lesion region LB is detected in the endoscopic image EGB is displayed. According to the display image DGB shown in FIG. 6, the marks MB2, MB3, and MB4 having a shape indicating that the lesion region LB is not detected in the reference regions AR2, AR3, and AR4 of the endoscopic image EGB are displayed. Note that broken lines in the display screen shown in FIG. 6 are drawn to explain, for example, a positional relation between the lesion region LB and the mark display regions AM1 to AM4. Therefore, the broken lines are not actually displayed on the display apparatus 14.

According to a display example shown in FIG. 6, as the processing in step S2 in FIG. 2, processing for respectively generating the marks MB1, MB2, MB3, and MB4 indicating that the lesion region LB is detected in the endoscopic image EGB is performed by the display control unit 133. According to the display example shown in FIG. 6, as the processing in step S2 in FIG. 2, processing for specifying that a present position of the lesion region LB is included in the reference region AR1 is performed by the display control unit 133. According to the display example shown in FIG. 6, as the processing in step S2 in FIG. 2, processing for generating the mark MB1 having a triangular shape pointing at the reference region AR1 equivalent to a region where the lesion region LB is detected in the endoscopic image EGB is performed by the display control unit 133. According to the display example shown in FIG. 6, as the processing in step S2 in FIG. 2, processing for generating the marks MB2, MB3, and MB4 having triangular shapes pointing at directions different from a direction in which the reference region AR1 is present in the endoscopic image EGB is performed by the display control unit 133. According to the display example shown in FIG. 6, as the processing in step S3 in FIG. 2, processing for generating the display image DGB including the endoscopic image EGB and the marks MB1 to MB4 and causing the display apparatus 14 to display the display image DGB is performed by the display control unit 133.

In other words, according to the display example shown in FIG. 6, processing for displaying marks one by one in each of N mark display regions, processing for specifying, based on the lesion information IL, one reference region AR1 including a present position of the lesion region LB among a predetermined plurality of reference regions, and processing for setting a shape of one mark MB1 displayed in one mark display region AM1 set in a position closest to the one reference region AR1 among the N mark display regions to a shape pointing at the one reference region AR1 are performed by the display control unit 133.

Figure 7:
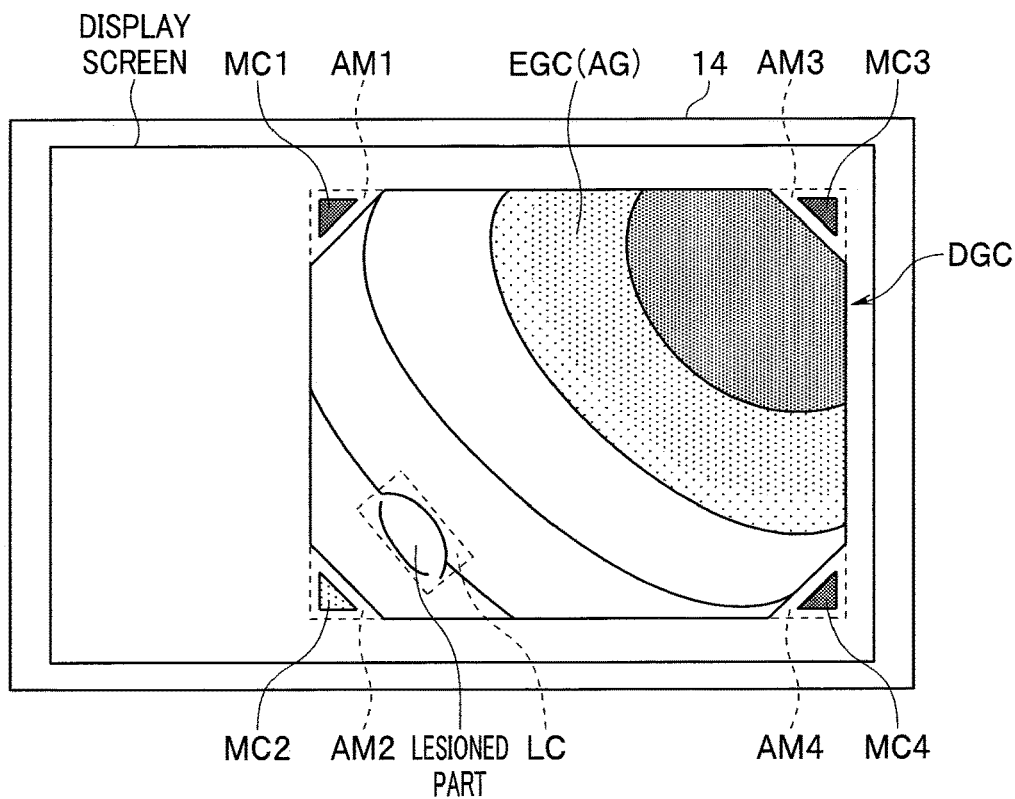
FIG. 7 is a diagram showing an example of a display image displayed according to the processing of the endoscopic image processing apparatus according to the first embodiment.

In an endoscopic image display region AG of a display image DGC shown in FIG. 7, an endoscopic image EGC having the same shape and the same size as a shape and a size of the endoscopic image display region AG is displayed. According to the endoscopic image EGC shown in FIG. 7, a lesion region LC is included in the reference region AR2 (see FIG. 4) set in a lower left part of the endoscopic image EGC. Therefore, according to the display image DGC shown in FIG. 7, four marks MC1, MC2, MC3, and MC4 indicating that the lesion region LC is detected in the endoscopic image EGC are displayed in the mark display regions AM1 to AM4. According to the display image DGC shown in FIG. 7, the mark MC2 having luminance indicating that the lesion region LC is detected in the reference region AR2 of the endoscopic image EGC is displayed. According to the display image DGC shown in FIG. 7, the marks MC1, MC3, and MC4 having luminance indicating that the lesion region LC is not detected in the reference regions AR1, AR3, and AR4 of the endoscopic image EGC are displayed. Note that broken lines in the display screen shown in FIG. 7 are drawn to explain, for example, a positional relation between the lesion region LC and the mark display regions AM1 to AM4. Therefore, the broken lines are not actually displayed on the display apparatus 14.

According to a display example shown in FIG. 7, as the processing in step S2 in FIG. 2, processing for respectively generating the marks MC1, MC2, MC3, and MC4 indicating that the lesion region LC is detected in the endoscopic image EGC is performed by the display control unit 133. According to the display example shown in FIG. 7, as the processing in step S2 in FIG. 2, processing for specifying that a present position of the lesion region LC is included in the reference region AR2 is performed by the display control unit 133. According to the display example shown in FIG. 7, as the processing in step S2 in FIG. 2, processing for generating the mark MC2 having luminance BHA is performed by the display control unit 133. According to the display example shown in FIG. 7, as the processing in step S2 in FIG. 2, processing for generating the marks MC1, MC3, and MC4 having luminance BLA lower than the luminance BHA is performed by the display control unit 133. In other words, according to the display example shown in FIG. 7, as the processing in step S2 in FIG. 2, processing for setting luminance of the mark MC2 to luminance higher than luminance of the marks MC1, MC3, and MC4 is performed by the display control unit 133. According to the display example shown in FIG. 7, as the processing in step S3 in FIG. 2, processing for generating the display image DGC including the endoscopic image EGC and the marks MC1 to MC4 and causing the display apparatus 14 to display the display image DGC is performed by the display control unit 133.

In other words, according to the display example shown in FIG. 7, processing for displaying marks one by one in each of the N mark display regions, processing for specifying, based on the lesion information IL, one reference region AR2 including a present position of the lesion region L among a predetermined plurality of reference regions, and processing for setting luminance of one mark MC2 displayed in one mark display region AM2 set in a position closest to the one reference region AR2 among the N mark display regions to luminance different from luminance of (N−1) marks other than the one mark MC2 are performed by the display control unit 133.

Figure 8:
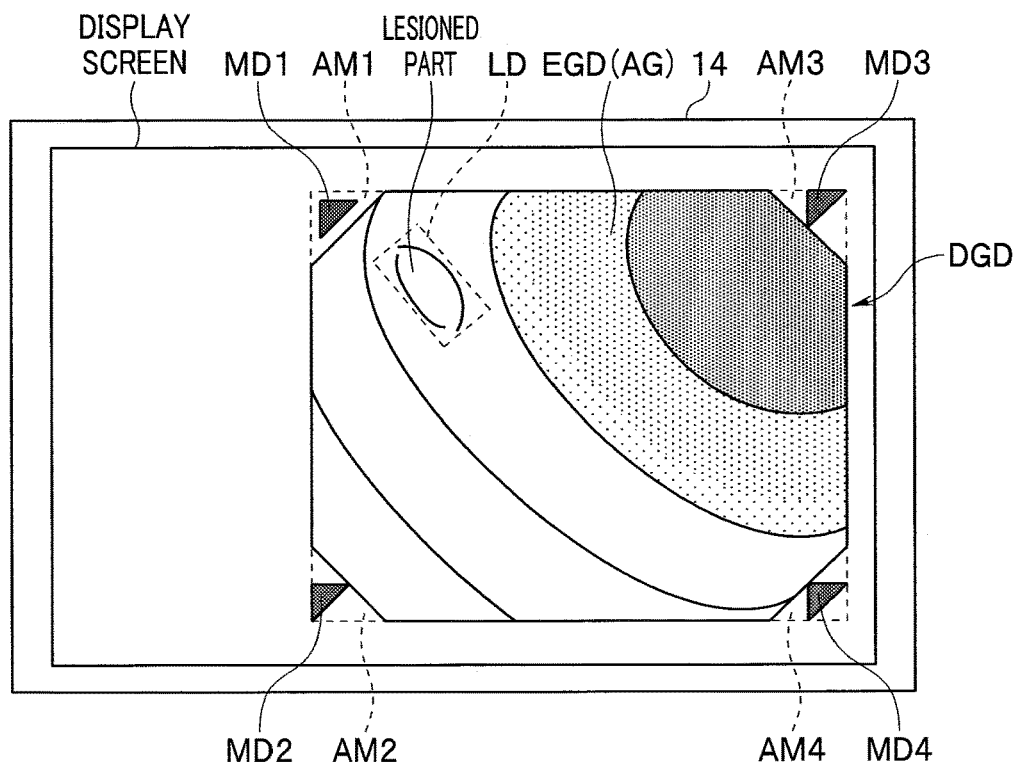
FIG. 8 is a diagram showing an example of a display image displayed according to the processing of the endoscopic image processing apparatus according to the first embodiment.

In an endoscopic image display region AG of a display image DGD shown in FIG. 8, an endoscopic image EGD having the same shape and the same size as a shape and a size of the endoscopic image display region AG is displayed. According to the endoscopic image EGD shown in FIG. 8, a lesion region LD is included in the reference region AR1 (see FIG. 4) set in an upper left part of the endoscopic image EGD. Therefore, according to the display image DGD shown in FIG. 8, four marks MD1, MD2, MD3, and MD4 indicating that the lesion region LD is detected in the endoscopic image EGD are displayed in the mark display regions AM1 to AM4. According to the display image DGD shown in FIG. 8, the marks MD1 to MD4 having a shape indicating that the lesion region LD is detected in the reference region AR1 of the endoscopic image EGD are displayed. In other words, according to the display image DGD shown in FIG. 8, the marks MD1 to MD4 having triangular shapes pointing at the reference region AR1 equivalent to a region where the lesion region LD is detected in the endoscopic image EGD are displayed. Note that broken lines in a display screen shown in FIG. 8 are drawn to explain, for example, a positional relation between the lesion region LD and the mark display regions AM1 to AM4. Therefore, the broken lines are not actually displayed on the display apparatus 14.

According to a display example shown in FIG. 8, as the processing in step S2 in FIG. 2, processing for respectively generating the marks MD1, MD2, MD3, and MD4 indicating that the lesion region LD is detected in the endoscopic image EGD is performed by the display control unit 133. According to the display example shown in FIG. 8, as the processing in step S2 in FIG. 2, processing for specifying that a present position of the lesion region LD is included in the reference region AR1 is performed by the display control unit 133. According to the display example shown in FIG. 8, as the processing in step S2 in FIG. 2, processing for generating the marks MD1 to MD4 having triangular shapes pointing at directions in which the reference region AR1 including the lesion region LD is present in the endoscopic image EGD (a direction equivalent to an upper left side of the endoscopic image EGD) is performed by the display control unit 133. According to the display example shown in FIG. 8, as the processing in step S3 in FIG. 2, processing for generating the display image DGD including the endoscopic image EGD and the marks MD1 to MD4 and causing the display apparatus 14 to display the display image DGD is performed by the display control unit 133.

In other words, according to the display example shown in FIG. 8, processing for displaying marks one by one in each of N mark display regions, processing for specifying, based on the lesion information IL, one reference region AR1 including a present position of the lesion region L among a predetermined plurality of reference regions, and processing for setting shapes of N marks displayed in the N mark display regions to shapes pointing at directions in which the one reference region AR1 is present in the endoscopic image EG are performed by the display control unit 133.

According to the display examples according to the present embodiment, processing for generating one or more marks indicating, as an overview of a detection state of the lesion region L by the lesion detecting unit 131, whether the lesion region L is detected in the endoscopic image EG and indicating in which reference region among a predetermined plurality of reference regions set in the endoscopic image EG a present position of the lesion region L is included and displaying the one or more marks in at least one of N mark display regions is performed by the display control unit 133. According to the respective display examples according to the present embodiment, when a determination result indicating that the lesion region L is included in the endoscopic image EG is obtained by the determining unit 132, processing for generating, based on the lesion information IL, one or more and four or less M marks indicating an overview of a detection state of the lesion region L by the lesion detecting unit 131 and processing for displaying the M marks one by one in M mark display regions among four mark display regions AM1 to AM4 are performed by the display control unit 133.

As explained above, according to the present embodiment, for example, even when a situation in which a position of the lesion region L frequently changes on an inside of the endoscopic image EG occurs, one or more marks having a display form corresponding to a part where the lesion region L is currently detected can be displayed in a mark display region set in a predetermined position outside the endoscopic image display region AG on the display screen of the display apparatus 14. Therefore, according to the present embodiment, for example, the user can easily grasp a detection state of the lesion region L by viewing marks displayed in one or more mark display regions set in predetermined positions on the display screen of the display apparatus 14. Therefore, according to the present embodiment, it is possible to reduce a burden on the user who performs work such as diagnosis of a lesioned part through an endoscopic observation.

As explained above, according to the present embodiment, processing for limiting information obtained when the user views marks displayed in one or more mark display regions to information indicating an overview of a detection state of the lesion region L in the endoscopic image EG is performed. Therefore, according to the present embodiment, for example, it is possible to prevent, as much as possible, a hasty assumption from being given to the user who performs diagnosis of the lesion region L included in the endoscopic image EG.

Note that, according to the present embodiment, for example, by applying a method relating to estimation of an image pickup distance disclosed by Japanese Patent Application Laid-Open Publication No. 2013-255656, processing for detecting (based on a red component or the like of the endoscopic image EG) an estimated distance EL from the distal end portion of the insertion section of the endoscope 11 may be performed by the lesion detecting unit 131. Processing for displaying, in a mark display region, a mark generated based on the estimated distance EL may be performed by the display control unit 133. With such processing, for example, it is possible to display, in the mark display region, a mark having a relatively large size when the estimated distance EL is short and, on the other hand, display, in the mark display region, a mark having a relatively small size when the estimated distance EL is long. According to the processing explained above, for example, it is possible to display, in the mark display region, a mark having relatively high luminance when the estimated distance EL is short and, on the other hand, display, in the mark display region, a mark having relatively low luminance when the estimated distance EL is long. In other words, according to the processing explained above, processing for generating, based on the estimated distance EL, one or more marks further indicating, as an overview of a detection state of the lesion region L, how far the distal end portion of the insertion section of the endoscope 11 and a lesioned part included in the lesion region L are apart is performed by the display control unit 133.

The display control unit 133 in the present embodiment may be configured to perform, in combination, a plurality of kinds of processing relating to display methods for marks corresponding to each of the display examples shown in FIG. 5 to FIG. 8.

According to the present embodiment, the mark display region on the display screen may be set in a position different from the position shown in FIG. 3 as long as the mark display region is set in a predetermined position outside the endoscopic image display region AG on the display screen of the display apparatus 14 and set in a position where the user can visually recognize an overview of a detection state of the lesion region L in the endoscopic image EG displayed in the endoscopic image display region AG.

According to the present embodiment, a number of mark display regions included in the display screen may be set to any number as long as the mark display regions are set in predetermined positions outside the endoscopic image display region AG on the display screen of the display apparatus 14 and are set as regions as many as a maximum display number of marks indicating an overview of a detection state of the lesion region L in the endoscopic image EG displayed in the endoscopic image display region AG.

According to the present embodiment, a shape of a mark displayed in the mark display region may be transformed into any shape as long as the mark has a shape so that the user can visually recognize an overview of a detection state of the lesion region L in the endoscopic image EG displayed in the endoscopic image display region AG.

According to the present embodiment, processing for generating a mark having a color so that the user can visually recognize an overview of a detection state of the lesion region L in the endoscopic image EG may be performed. Processing for causing the display apparatus 14 to display a display image including the endoscopic image EG and the mark may be performed. With such a configuration, for example, when a determination result indicating that the lesion region L is included in the endoscopic image EG is obtained by the determining unit 132, processing for displaying marks having a predetermined color one by one in each of N mark display regions, processing for specifying, based on the lesion information IL, one reference region including a present position of the lesion region L among a predetermined plurality of reference regions, and processing for changing a color of one mark displayed in one mark display region set in a position closest to the one reference region among the N mark display regions to a color different from the predetermined color are performed by the display control unit 133.

Second Embodiment

FIG. 9 to FIG. 15 relate to a second embodiment.

Figure 9:
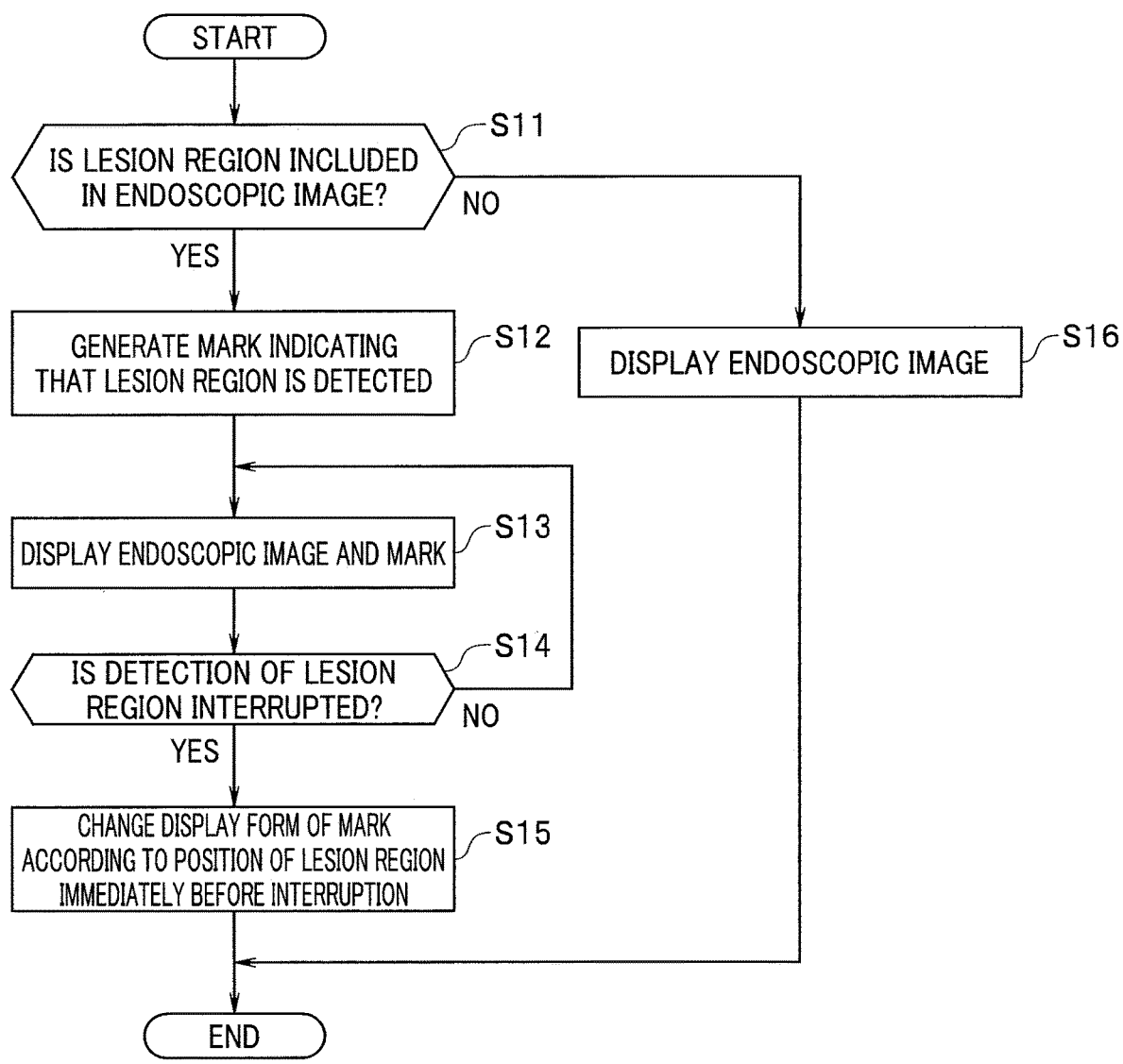
FIG. 9 is a flowchart for explaining processing performed in an endoscopic image processing apparatus according to a second embodiment.

Note that, in the present embodiment, the endoscope system 1 having the same configuration as the configuration in the first embodiment can be used. On the other hand, processing different from the processing in the first embodiment is performed in the endoscopic image processing apparatus 13. Accordingly, in the following explanation, a specific example of processing performed in respective units of the endoscopic image processing apparatus 13 is explained with reference to FIG. 9 and the like. On the other hand, specific explanation concerning portions to which the processing and the like explained in the first embodiment can be applied is omitted as appropriate. More specifically, in the following explanation, the description assumes that processing is performed in a state in which the endoscopic image display region AG and the mark display regions AM1 to AM4 illustrated in FIG. 3 are set on a display screen of the display apparatus 14 and the reference regions AR1 to AR4 illustrated in FIG. 4 are set in the endoscopic image EG. FIG. 9 is a flowchart for explaining a specific example of processing performed in an endoscopic image processing apparatus according to the second embodiment.

The lesion detecting unit 131 performs processing for detecting the lesion region L equivalent to a region estimated as including a lesioned part in the endoscopic image EG and performs processing for acquiring the lesion information IL equivalent to information indicating the detected lesion region L.

The determining unit 132 determines, according to an acquisition state of the lesion information IL in the lesion detecting unit 131, whether the lesion region L is included in the endoscopic image EG (step S11 in FIG. 9).

When a determination result indicating that the lesion region L is not included in the endoscopic image EG is obtained by the determining unit 132 (S11: NO), the display control unit 133 generates a display image for displaying the endoscopic image EG in an endoscopic image display region and outputs the display image to the display apparatus 14 (step S16 in FIG. 9) and, thereafter, ends a series of processing.

When a determination result indicating that the lesion region L is included in the endoscopic image EG is obtained by the determining unit 132 (S11: YES), the display control unit 133 performs processing for generating a mark indicating that the lesion region L is detected in the endoscopic image EG (step S12 in FIG. 9).

The display control unit 133 generates a display image for displaying the endoscopic image EG in the endoscopic image display region and displaying the mark generated in step S12 in FIG. 9 in a mark display region and outputs the display image to the display apparatus 14 (step S13 in FIG. 9).

Figure 10:
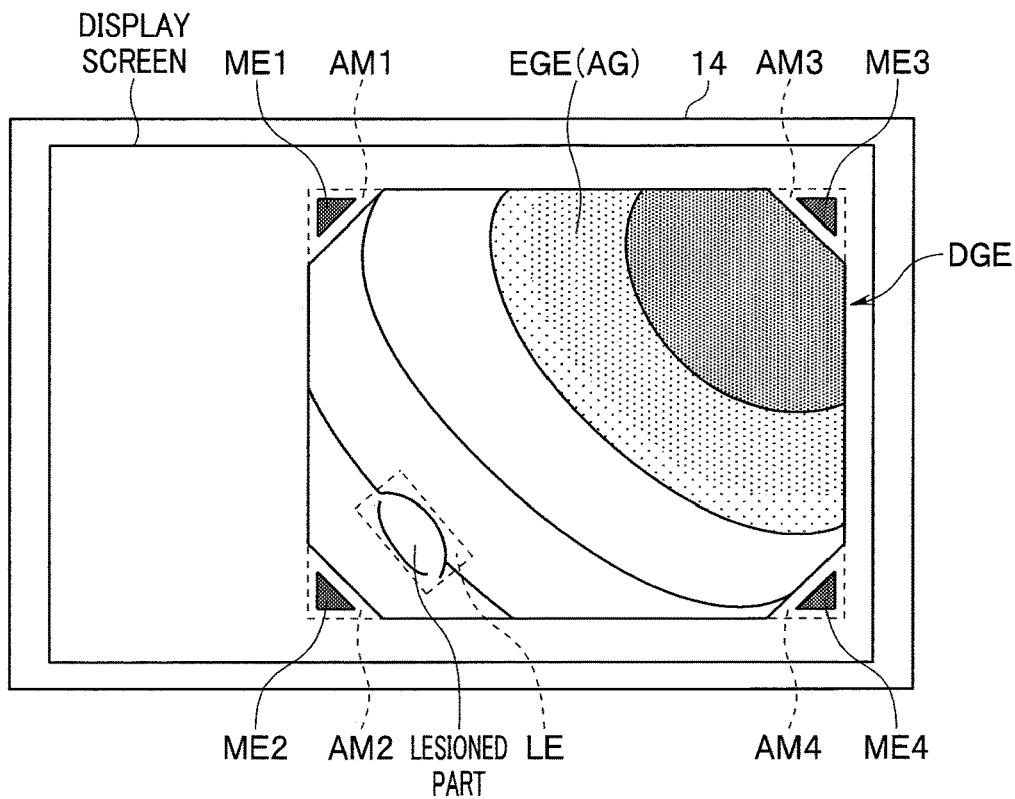
FIG. 10 is a diagram showing an example of a display image displayed according to the processing of the endoscopic image processing apparatus according to the second embodiment.

According to the processing in step S12 and step S13 in FIG. 9, for example, a display image DGE shown in FIG. 10 is displayed on the display apparatus 14. FIG. 10 is a diagram showing an example of a display image displayed according to processing of the endoscopic image processing apparatus according to the second embodiment.

In the endoscopic image display region AG of the display image DGE shown in FIG. 10, an endoscopic image EGE having the same shape and the same size as a shape and a size of the endoscopic image display region AG is displayed. According to the endoscopic image EGE shown in FIG. 6, a lesion region LE is included in the reference region AR2 (see FIG. 4) set on a lower left side of the endoscopic image EGE. Therefore, according to the display image DGE shown in FIG. 10, four marks ME1, ME2, ME3, and ME4 indicating that the lesion region LE is detected in the endoscopic image EGE are displayed in the mark display regions AM1 to AM4. Note that broken lines in the display screen shown in FIG. 10 are drawn to explain, for example, a positional relation between the lesion region LE and the mark display regions AM1 to AM4. Therefore, the broken lines are not actually displayed on the display apparatus 14.

According to a display example shown in FIG. 10, as the processing in step S12 in FIG. 9, processing for respectively generating the marks ME1, ME2, ME3, and ME4 indicating that the lesion region LE is detected in the endoscopic image EGE is performed by the display control unit 133. According to the display example shown in FIG. 10, as the processing in step S13 in FIG. 9, processing for generating the display image DGE including the endoscopic image EGE and the marks ME1 to ME4 and causing the display apparatus 14 to display the display image DGE is performed by the display control unit 133.

The determining unit 132 sequentially stores, in a memory, the lesion information IL obtained by the lesion detecting unit 131 in the processing in step S11 and the subsequent processing in FIG. 9. The determining unit 132 performs processing for determining, based on the lesion information IL stored in the memory, whether detection of the lesion region L corresponding to the lesion information IL is interrupted (step S14 in FIG. 9).

When a determination result indicating that the detection of the lesion region L is not interrupted is obtained by the determining unit 132 (S14: NO), the display control unit 133 returns to step S13 in FIG. 9 and performs the processing. In other words, according to the present embodiment, a display image illustrated in FIG. 10 including the mark generated in step S13 in FIG. 9 continues to be displayed on the display apparatus 14 in a period in which the detection of the lesion region L by the lesion detecting unit 131 is continued.

When a determination result indicating that the detection of the lesion region L is interrupted is obtained by the determining unit 132 (S14: YES), the display control unit 133 performs processing for changing, according to in which reference region among a predetermined plurality of reference regions set in the endoscopic image EG a position of the lesion region L specified from the lesion information IL immediately before the determination result is obtained, that is, a position where the lesion region L is present immediately before the detection of the lesion region L is interrupted is included, a display form of at least one mark currently displayed on the display apparatus 14 (step S15 in FIG. 9) and, thereafter, ends the series of processing. Note that, in the present embodiment, when the display form of the mark is changed by the processing in step S15 in FIG. 9, the display form after the change is maintained for a constant period.

Figure 11:
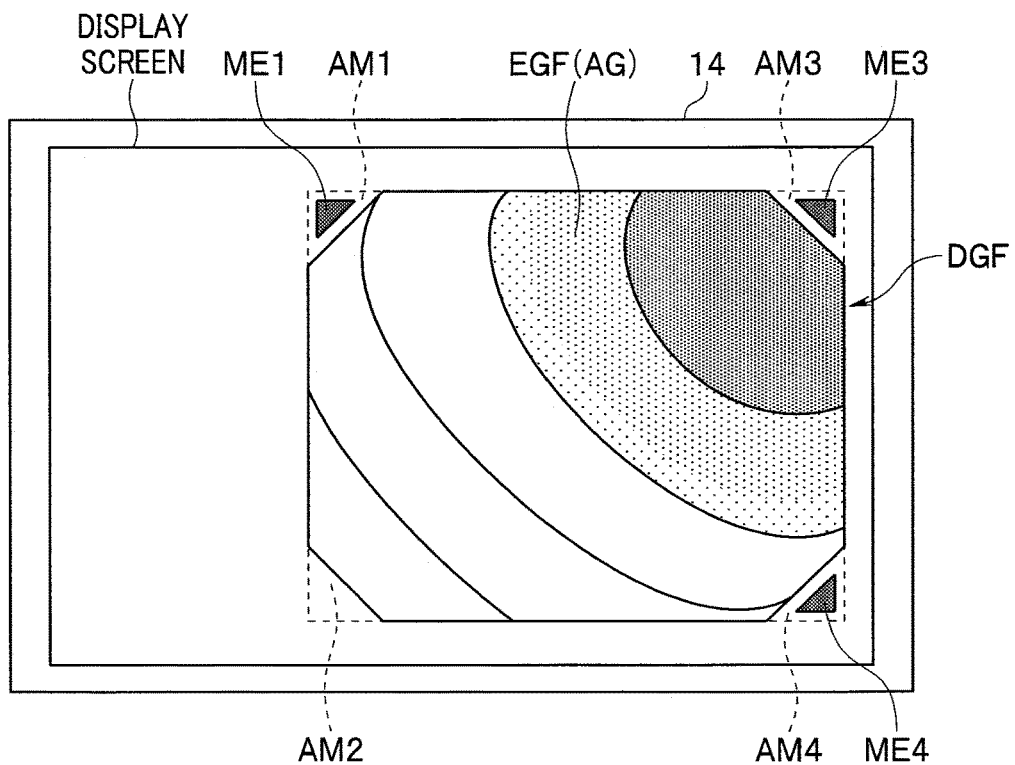
FIG. 11 is a diagram showing an example of a display image displayed according to the processing of the endoscopic image processing apparatus according to the second embodiment.
Figure 12:
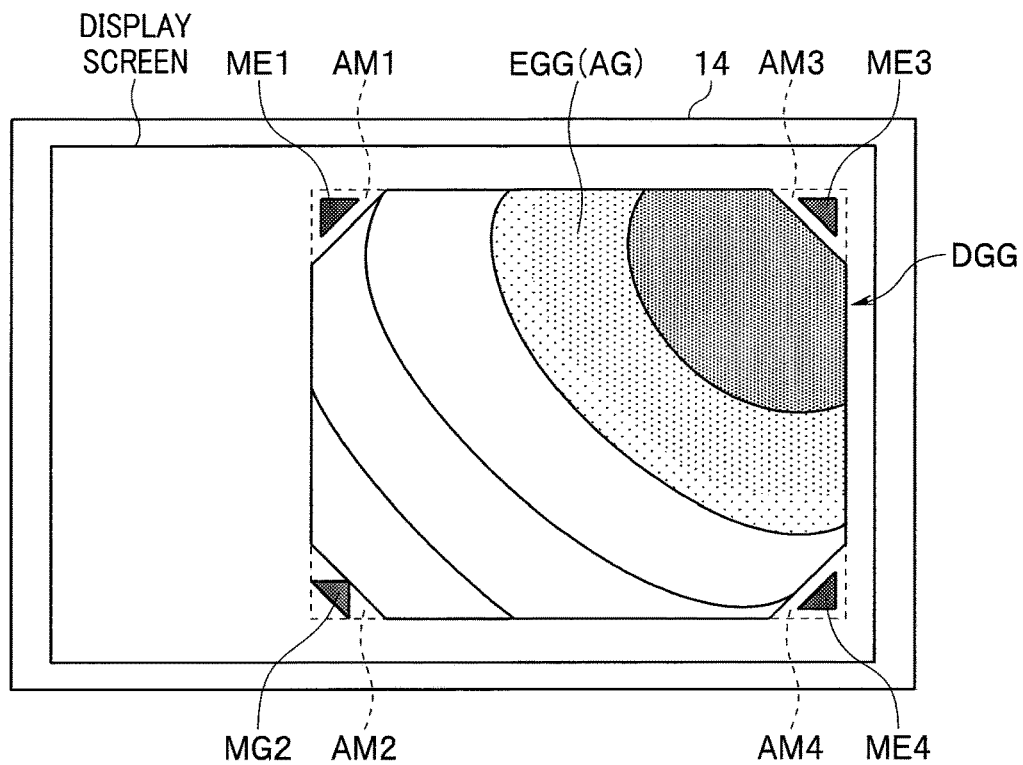
FIG. 12 is a diagram showing an example of a display image displayed according to the processing of the endoscopic image processing apparatus according to the second embodiment.
Figure 13:
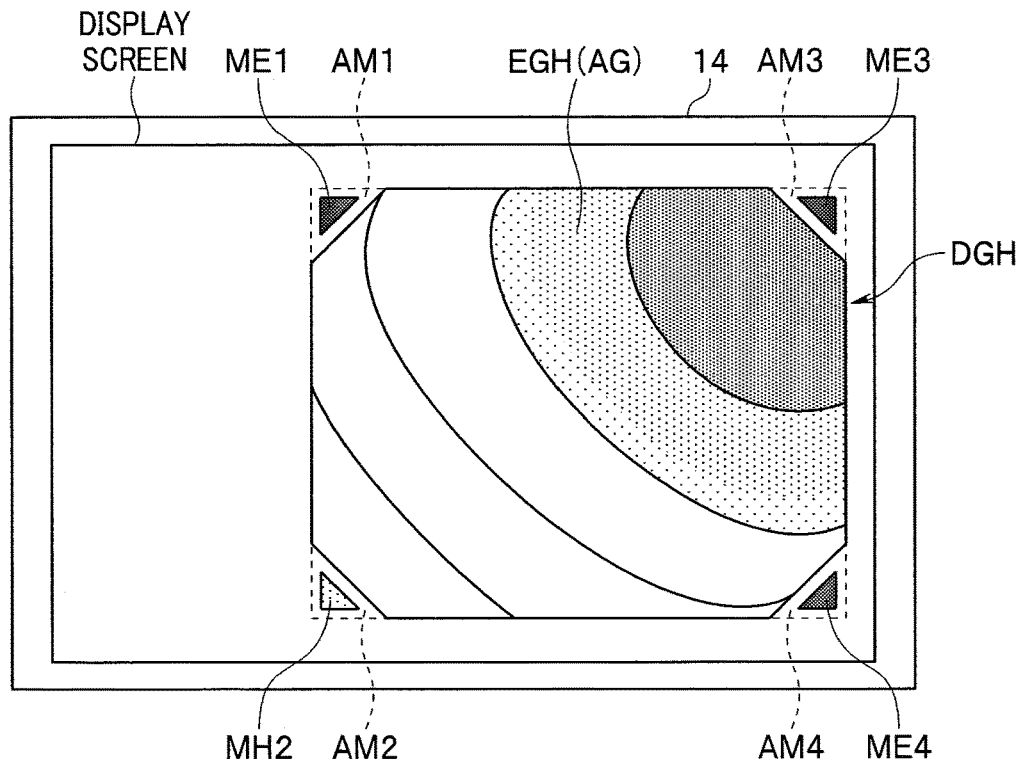
FIG. 13 is a diagram showing an example of a display image displayed according to the processing of the endoscopic image processing apparatus according to the second embodiment.

For example, when the processing in step S15 in FIG. 9 is performed immediately after the detection of the lesion region LE is interrupted because a lesioned part included in the endoscopic image EGE shown in FIG. 10 is displaced to an outside of the endoscopic image EGE, a display image shown in any one of FIG. 11 to FIG. 13 is displayed on the display apparatus 14. FIG. 11 to FIG. 13 are figures showing examples of display images displayed according to processing of the endoscopic image processing apparatus according to the second embodiment.

In an endoscopic image display region AG of a display image DGF shown in FIG. 11, an endoscopic image EGF having the same shape and the same size as a shape and a size of the endoscopic image display region AG and equivalent to an image in which a lesioned part included in the lesion region LE in the endoscopic image EGE shown in FIG. 10 is framed out is displayed. According to the display image DGF shown in FIG. 11, a mark is not displayed in the mark display region AM2 corresponding to the reference region AR2 in the endoscopic image EGF. According to the display image DGF shown in FIG. 11, the same marks ME1, ME3, and ME4 as the marks shown in FIG. 10 are displayed in the mark display regions AM1, AM3, and AM4 corresponding to three reference regions other than the reference region AR2 in the endoscopic image EGF.

According to a display example shown in FIG. 11, as the processing in step S15 in FIG. 9, processing for specifying that a position of the lesion region LE immediately before the determination result indicating that the detection of the lesion region LE is interrupted is obtained is included in the reference region AR2 is performed by the display control unit 133. According to the display example shown in FIG. 11, as the processing in step S15 in FIG. 9, processing for erasing, from the mark display region AM2, the mark ME2 corresponding to the reference region AR2 present immediately before the lesioned part included in the lesion region LE is displaced to the outside of the endoscopic image EGE is performed by the display control unit 133.

In other words, according to the display example shown in FIG. 11, when a determination result indicating that the lesion region L is included in the endoscopic image EG is obtained by the determining unit 132, processing for displaying marks one by one in each of N mark display regions is performed by the display control unit 133. According to the display example shown in FIG. 11, when a determination result indicating that the detection of the lesion region LE is interrupted is obtained by the determining unit 132, processing for specifying, based on the lesion information IL, one reference region AR2 including a position where the lesion region LE is present immediately before the detection of the lesion region LE is interrupted among a predetermined plurality of reference regions and processing for erasing one mark ME2 displayed in one mark display region AM2 set in a position closest to the one reference region AR2 among the N mark display regions are performed by the display control unit 133.

Note that, according to the present embodiment, as the processing in step S15 in FIG. 9, instead of the processing for erasing the mark ME2 corresponding to the reference region AR2 from the mark display region AM2 being performed, for example, processing for erasing marks from the mark display regions AM1, AM3, and AM4 corresponding to the reference regions AR1, AR3, and AR4 may be performed by the display control unit 133.

In an endoscopic image display region AG of a display image DGG shown in FIG. 12, an endoscopic image EGG having the same shape and the same size as a shape and a size of the endoscopic image display region AG and equivalent to an image in which a lesioned part included in the lesion region LE in the endoscopic image EGE shown in FIG. 10 is framed out is displayed. According to the display image DGG shown in FIG. 12, a mark MG2 having a shape different from the shape of the mark ME2 shown in FIG. 10 is displayed in the mark display region AM2 corresponding to the reference region AR2 in the endoscopic image EGG. According to the display image DGG shown in FIG. 12, the marks ME1, ME3, and ME4 having the same shapes as the shapes of the marks shown in FIG. 10 are displayed in the mark display regions AM1, AM3, and AM4 corresponding to three reference regions other than the reference region AR2 in the endoscopic image EGG.

According to a display example shown in FIG. 12, as the processing in step S15 in FIG. 9, processing for specifying that a position of the lesion region LE immediately before the determination result indicating that the detection of the lesion region LE is interrupted is obtained is included in the reference region AR2 is performed by the display control unit 133. According to the display example shown in FIG. 12, as the processing in step S15 in FIG. 9, processing for changing a shape of the mark ME2 corresponding to the reference region AR2 present immediately before the lesioned part included in the lesion region LE is displaced to an outside of the endoscopic image EGE to thereby generate the mark MG2 having a triangular shape pointing at the reference region AR2 is performed by the display control unit 133.

In other words, according to the display example shown in FIG. 12, when a determination result indicating that the lesion region L is included in the endoscopic image EG is obtained by the determining unit 132, processing for displaying marks one by one in each of N mark display regions is performed by the display control unit 133. According to the display example shown in FIG. 12, when a determination result indicating that the detection of the lesion region LE is interrupted is obtained by the determining unit 132, processing for specifying, based on the lesion information IL, one reference region AR2 including a position where the lesion region LE is present immediately before the detection of the lesion region LE is interrupted among a predetermined plurality of reference regions and processing for setting a shape of one mark ME2 displayed in one mark display region AM2 set in a position closest to the one reference region AR2 among N mark display regions to a shape pointing at the one reference region AR2 are performed by the display control unit 133.

Note that, according to the present embodiment, as the processing in step S15 in FIG. 9, for example, processing for changing shapes of the marks ME1, ME3, and ME4 corresponding to the reference regions AR1, AR3, and AR4 to thereby generate marks pointing at the reference region AR2 may be performed by the display control unit 133. With such processing, for example, the marks ME1, ME3, and ME4 are displayed on the display apparatus 14 as a triangle having the same shape as the shape of the mark ME2.

In an endoscopic image display region AG of a display image DGH shown in FIG. 13, an endoscopic image EGH having the same shape and the same size as a shape and a size of the endoscopic image display region AG and equivalent to an image in which a lesioned part included in the lesion region LE in the endoscopic image EGE shown in FIG. 10 is framed out is displayed. According to the display image DGH shown in FIG. 13, a mark MH2 having luminance BLH higher than luminance BLB of the mark ME2 shown in FIG. 10 is displayed in the mark display region AM2 corresponding to the reference region AR2 in the endoscopic image EGH. According to the display image DGH shown in FIG. 13, the marks ME1, ME3, and ME4 having the same luminance as the luminance BLB of the mark ME2 shown in FIG. 10 are displayed in the mark display regions AM1, AM3, and AM4 corresponding to three reference regions other than the reference region AR2 in the endoscopic image EGH.

According to a display example shown in FIG. 13, as the processing in step S15 in FIG. 9, processing for specifying that a position of the lesion region LE immediately before the determination result indicating that the detection of the lesion region LE is interrupted is obtained is included in the reference region AR2 is performed by the display control unit 133. According to the display example shown in FIG. 13, as the processing in step S15 in FIG. 9, processing for increasing the luminance BLB of the mark ME2 corresponding to the reference region AR2 present immediately before the lesioned part included in the lesion region LE is displaced to an outside of the endoscopic image EGE to thereby generate the mark MH2 having luminance higher than the luminance BLB is performed by the display control unit 133. In other words, according to the display example shown in FIG. 13, as the processing in step S15 in FIG. 9, processing for setting luminance of the mark ME2 to luminance higher than luminance of the marks ME1, ME3, and ME4 is performed by the display control unit 133.

In other words, according to the display example shown in FIG. 13, when a determination result indicating that the lesion region L is included in the endoscopic image EG is obtained by the determining unit 132, processing for displaying marks one by one in each of N mark display regions is performed by the display control unit 133. According to the display example shown in FIG. 13, when a determination result indicating that the detection of the lesion region LE is interrupted is obtained by the determining unit 132, processing for specifying, based on the lesion information IL, one reference region AR2 including a position where the lesion region LE is present immediately before the detection of the lesion region LE is interrupted among a predetermined plurality of reference regions and processing for setting luminance of one mark ME2 displayed in one mark display region AM2 set in a position closest to the one reference region AR2 among N mark display regions to luminance different from luminance of (N−1) marks other than the one mark ME2 are performed by the display control unit 133.

Note that, according to the present embodiment, as the processing in step S15 in FIG. 9, instead of the processing for increasing the luminance BLB of the mark ME2 corresponding to the reference region AR2 being performed, for example, processing for reducing the luminance BLB of the marks MEL, ME3, and ME4 corresponding to the reference regions AR1, AR3, and AR4 may be performed by the display control unit 133.

According to the respective display examples according to the present embodiment, processing for generating one or more marks indicating, as an overview of a detection state of the lesion region L, whether the lesion region L is detected in the endoscopic image EG and indicating in which reference region among a predetermined plurality of reference regions set in the endoscopic image EG a position where the lesion region L is present immediately before the detection of the lesion region L is interrupted is included and displaying the one or more marks in at least one of N mark display regions is performed by the display control unit 133. According to the respective display examples according to the present embodiment, when a determination result indicating that the lesion region L is included in the endoscopic image EG is obtained by the determining unit 132, processing for generating four marks indicating that the lesion region L is detected and processing for displaying the four marks one by one in four mark display regions AM1 to AM4 are performed by the display control unit 133.

As explained above, according to the present embodiment, for example, even when a situation in which the lesion region L frequently repeats frame-in and frame-out occurs, a mark indicating whether the lesion region L is detected can be displayed in a mark display region set in a predetermined position outside the endoscopic image display region AG on the display screen of the display apparatus 14. Further, as explained above, according to the present embodiment, for example, even when a situation in which the lesion region L is displaced from the inside to the outside of the endoscopic image EG occurs, one or more marks having a display form corresponding to a part where the lesion region L is detected last can be displayed in a mark display region set in a predetermined position outside the endoscopic image display region AG on the display screen of the display apparatus 14. Therefore, according to the present embodiment, for example, the user can easily grasp a detection state of the lesion region L by viewing marks displayed in one or more mark display regions set in predetermined positions on the display screen of the display apparatus 14. Therefore, according to the present embodiment, it is possible to reduce a burden on the user who performs work such as diagnosis of a lesioned part through an endoscopic observation.

As explained above, according to the present embodiment, processing for limiting information obtained when the user views marks displayed in one or more mark display regions to information indicating an overview of a detection state of the lesion region L in the endoscopic image EG is performed. Therefore, according to the present embodiment, for example, it is possible to prevent, as much as possible, a hasty assumption from being given to the user who performs diagnosis of the lesion region L included in the endoscopic image EG.

Figure 14:
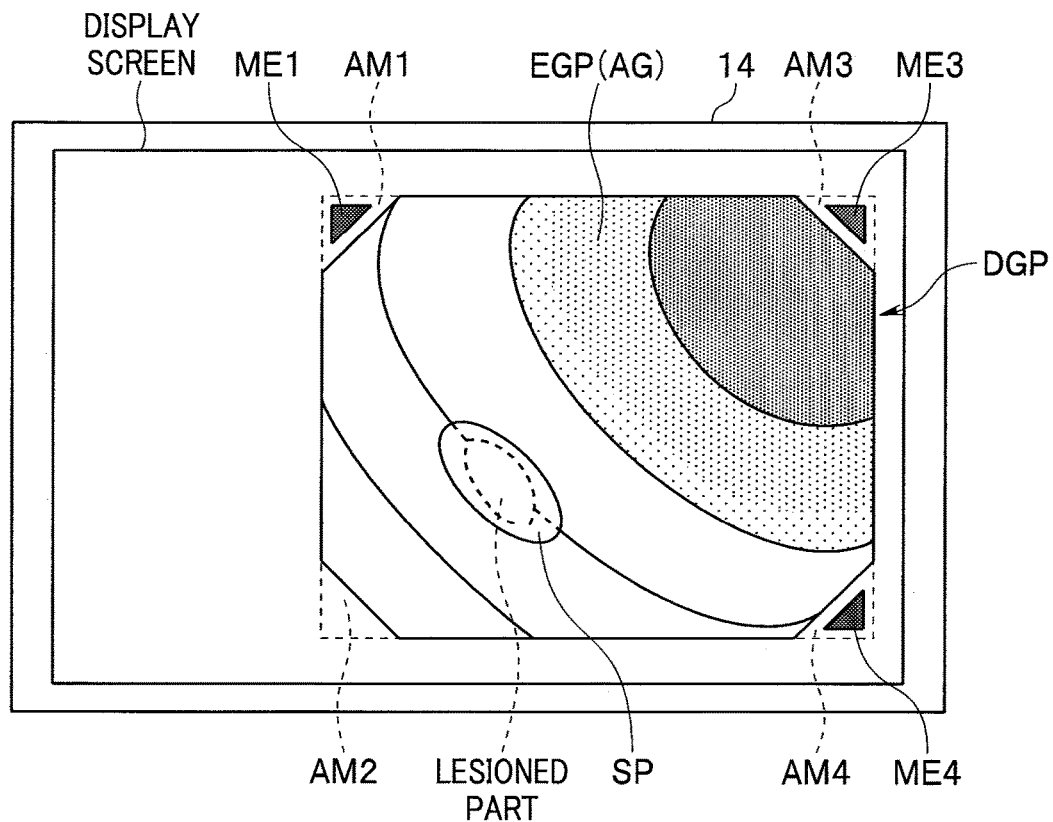
FIG. 14 is a diagram showing an example of a display image displayed according to the processing of the endoscopic image processing apparatus according to the second embodiment.

Note that the respective display examples explained in the present embodiment are applied substantially in the same manner when detection of the lesion region L is interrupted because a lesioned part included in the endoscopic image EG is displaced to behind a blocking object such as a residue. In such a case, for example, according to the processing in step S15 in FIG. 9, a display image DGP shown in FIG. 14 is displayed on the display apparatus 14. FIG. 14 is a diagram showing an example of a display image displayed according to processing of the endoscopic image processing apparatus according to the second embodiment.

In an endoscopic image display region AG of the display image DGP shown in FIG. 14, an endoscopic image EGP having the same shape and the same size as a shape and a size of the endoscopic image display region AG and equivalent to an image in which a lesioned part included in the lesion region LE in the endoscopic image EGE shown in FIG. 10 is displaced to behind a blocking object SP such as a residue is displayed. According to the display image DGP shown in FIG. 14, a mark is not displayed in the mark display region AM2 corresponding to the reference region AR2 in the endoscopic image EGP. According to the display image DGP shown in FIG. 14, the same marks ME1, ME3, and ME4 as the marks shown in FIG. 10 are displayed in the mark display regions AM1, AM3, and AM4 corresponding to three reference regions other than the reference region AR2 in the endoscopic image EGP. Note that broken lines in a display screen shown in FIG. 14 are drawn to indicate that the lesioned part included in the lesion region LE is located behind the blocking object SP. Therefore, the broken lines are not actually displayed on the display apparatus 14.

According to a display example shown in FIG. 14, as the processing in step S15 in FIG. 9, processing for specifying that a position of the lesion region LE immediately before the determination result indicating that the detection of the lesion region LE is interrupted is obtained is included in the reference region AR2 is performed by the display control unit 133. According to the display example shown in FIG. 14, as the processing in step S15 in FIG. 9, processing for erasing, from the mark display region AM2, the mark ME2 corresponding to the reference region AR2 present immediately before the lesioned part included in the lesion region LE is displaced to behind the blocking object SP is performed by the display control unit 133.

Figure 15:
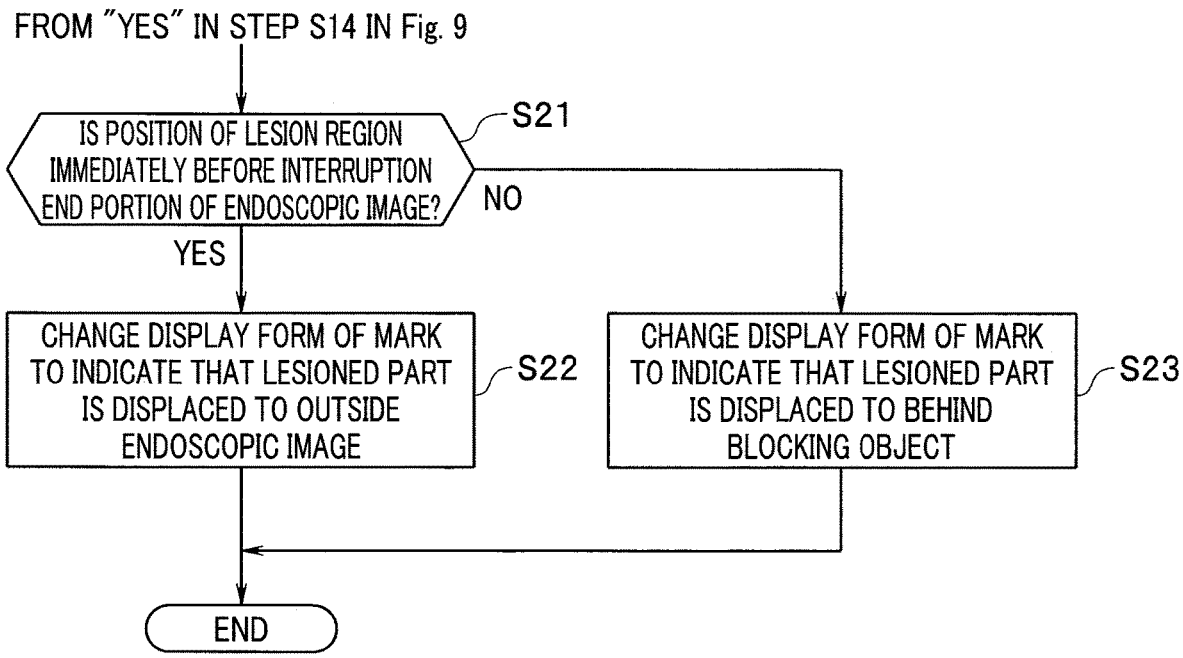
FIG. 15 is a flowchart for explaining processing performed in an endoscopic image processing apparatus according to a modification of the second embodiment.

The display control unit 133 in the present embodiment may be configured to, when a determination result indicating that the detection of the lesion region L is interrupted is obtained by the determining unit 132, for example, perform processing shown in FIG. 15 instead of the processing in step S15 in FIG. 9. A specific example of processing of the display control unit 133 according to such a modification is explained below. FIG. 15 is a flowchart for explaining processing performed in an endoscopic image processing apparatus according to a modification of the second embodiment.

When a determination result indicating that the detection of the lesion region L is interrupted is obtained by the determining unit 132 (S14: YES), the display control unit 133 performs processing for determining whether a position of the lesion region L specified from the lesion information IL immediately before the determination result is obtained, that is, a position of the lesion region L immediately before the detection of the lesion region L is interrupted is a position equivalent to an end portion of the endoscopic image EG (step S21 in FIG. 15).

When obtaining a determination result indicating that the position of the lesion region L immediately before the detection of the lesion region L is interrupted is the position equivalent to the end portion of the endoscopic image EG (S21: YES), the display control unit 133 performs processing for changing a display form of at least one mark currently displayed on the display apparatus 14 to indicate that the lesioned part included in the lesion region L is displaced to an outside of the endoscopic image EG (step S22 in FIG. 15) and, thereafter, ends a series of processing.

More specifically, the display control unit 133 performs, for example, processing for specifying that the position of the lesion region LE immediately before the detection of the lesion region LE shown in FIG. 10 is interrupted is included in the reference region AR2 and, when obtaining a determination result indicating that the position of the lesion region LE is a position equivalent to an end portion of the reference region AR2, generating the mark MH2 having the same display form as the display form in the display example shown in FIG. 13 and displaying the mark MH2 in the mark display region AM2.

When obtaining a determination result indicating that the position of the lesion region L immediately before the detection of the lesion region L is interrupted is a position equivalent to a position on an inner side relative to the end portion of the endoscopic image EG (S21: NO), the display control unit 133 performs processing for changing a display form of at least one mark currently displayed on the display apparatus 14 to indicate that the lesioned part included in the lesion region L is displaced to behind the blocking object such as the residue (step S23 in FIG. 15) and, thereafter, ends the series of processing.

More specifically, the display control unit 133 performs, for example, processing for specifying that the position of the lesion region LE immediately before the detection of the lesion region LE shown in FIG. 10 is interrupted is included in the reference region AR2 and, when obtaining a determination result indicating that the position of the lesion region LE is a position equivalent to a position on an inner side relative to the end portion of the reference region AR2, generating the mark MG2 having the same display form as the display form in the display example shown in FIG. 12 and displaying the mark MG2 in the mark display region AM2.

In other words, according to the processing shown in FIG. 15, processing for specifying, based on the lesion information IL, one reference region AR2 including a position where the lesion region LE is present immediately before the detection of the lesion region LE is interrupted among a predetermined plurality of reference regions and processing for setting a display form of one mark ME2 displayed in one mark display region AM2 set in a position closest to the one reference region AR2 among N mark display regions to a different display form according to a factor of the interruption of the detection of the lesion region LE are performed by the display control unit 133. According to the processing shown in FIG. 15, when the detection of the lesion region LE is interrupted because the lesioned part is displaced to the outside of the endoscopic image EG, processing for setting the display form of the one mark ME2 to a first display form (such as the mark MH2) is performed by the display control unit 133. According to the processing shown in FIG. 15, when the detection of the lesion region L is interrupted because the lesioned part is displaced to behind the blocking object included in the endoscopic image EG, processing for setting the display form of the one mark to a second display form (such as the mark MG2) different from the first display form is performed by the display control unit 133.

The display control unit 133 in the present embodiment may be configured to perform, in combination, a plurality of kinds of processing relating to display methods of marks corresponding to each of the display examples shown in FIG. 11 to FIG. 13.

According to the present embodiment, processing for generating a mark having a color so that the user can visually recognize an overview of a detection state of the lesion region L in the endoscopic image EG may be performed and processing for causing the display apparatus 14 to display a display image including the endoscopic image EG and the mark may be performed. With such a configuration, for example, when a determination result indicating that the lesion region L is included in the endoscopic image EG is obtained by the determining unit 132, processing for displaying marks having a predetermined color one by one in each of N mark display regions is performed by the display control unit 133. With the configuration explained above, for example, when a determination result indicating that the detection of the lesion region L is interrupted is obtained by the determining unit 132, processing for specifying, based on the lesion information IL, one reference region including a position where the lesion region L is present immediately before the detection of the lesion region L is interrupted among a predetermined plurality of reference regions and processing for changing a color of one mark displayed in one mark display region set in a position closest to the one reference region among N mark display regions to a color different from the predetermined color are performed by the display control unit 133.

Note that the present invention is not limited to the embodiments explained above. Various changes and applications of the present invention are possible within a range not departing from the gist of the invention.

What is claimed is:
1. An endoscopic image processing apparatus comprising:
at least one processor comprising hardware, the at least one processor configured to:
acquire a first endoscopic image including two or more first endoscopic regions including at least one first region having a lesion region;
acquire a second endoscopic image subsequently acquired after the first endoscopic image is acquired, the second endoscopic image not including the lesion region, the second endoscopic image including two or more second endoscopic regions corresponding to the two or more first endoscopic regions, the two or more second endoscopic regions including at least one third region corresponding to the at least one first region;
generate a first display image including the first endoscopic image and at least one first marker indicating a presence of the lesion region; and;
generate a second display image including the second endoscopic image and at least one second marker indicating the at least one second region, the at least one second marker being different from the at least one first marker,
wherein the at least one second marker is maintained in a third endoscopic display image subsequently acquired after the second endoscopic image is acquired; and
the at least one processor is configured to:
determine, in the second endoscopic image, whether the lesion region is provided outside of the second endoscopic image or behind an obstruction in the second endoscopic image;
when the lesion region is located outside the second endoscopic image, generate the second display image including the second endoscopic image and the at least one second marker with a first characteristic; and
when the lesion region is located at behind an obstruction in the second endoscopic image, generate the second display image including the second endoscopic image and the at least one second marker with a second characteristic being different from the first characteristic.
2. The endoscopic image processing apparatus according to claim 1, wherein
the at least one processor is configured to:
detect the lesion region in the first endoscopic image, and determine the at least one first region having the lesion region.

3. The endoscopic image processing apparatus according to claim 1, wherein the at least one first marker in the first display image is only provided adjacent to the at least one first region.

4. The endoscopic image processing apparatus according to claim 1, wherein the at least one first marker in the first display image comprises a first marker provided closest to the at least one first region, and the first marker has a shape directed toward the at least one first region.

5. The endoscopic image processing apparatus according to claim 1, wherein the at least one first marker in the first display image comprises:
   a first marker provided closest to at least on first region, and the first marker having one of a first luminance or a first color; and
   a second marker having one of a second luminance being different from the first luminance, or a second color being different from the first color.

6. The endoscopic image processing apparatus according to claim 1, wherein the at least one first marker comprises:
   a first marker; and
   one or more second markers having a shape directed toward the at least one first region, the one or more second markers provided further from at least one first region than the first marker.

7. The endoscopic image processing apparatus according to claim 1, wherein
   the processor is configured to estimate a distance from a distal end portion of an insertion section of the endoscope to a surface of the lesion region, and
   the first display image indicates the distance.

8. The endoscopic image processing apparatus according to claim 1, wherein the at least one second marker in the second display image is adjacent to a region of the two or more second endoscopic regions that is farthest from the at least one second region.

9. The endoscopic image processing apparatus according to claim 1, wherein the at least one second marker in the second display image comprises a first marker provided closest to the at least one second region, and the first marker has a shape directed toward the at least one second region.

10. The endoscopic imaging processing apparatus of claim 1, wherein an outer periphery of the at least one first marker has a triangular shape.

11. The endoscopic image processing apparatus according to claim 1, wherein the at least one second marker is different from the at least one first marker in at least one of luminance or color.

12. The endoscopic image processing apparatus according to claim 1, wherein the at least one second marker is different from the at least one first marker in at least one of position or orientation.

13. The endoscopic image processing apparatus according to claim 1, wherein an entirety of the second marker is maintained in the second and the third endoscopic display images.

14. The endoscopic image processing apparatus according to claim 1, wherein the at least one processor is configured to:
   acquire a third endoscopic image subsequently acquired after the second endoscopic image is acquired, the third endoscopic image not including the lesion region, the third endoscopic image including two or more third endoscopic regions corresponding to the two or more first endoscopic regions, the two or more third endoscopic regions including at least one third region corresponding to the at least one first region;
   generate the third endoscopic display image including the third endoscopic image and at least one third marker indicating the at least one third region, the at least one third marker being the same as the at least one second marker.

15. The endoscopic image processing apparatus according to claim 1, wherein
   the at least one first marker comprises a first marker portion provided closest to the at least one first region,
   the at least one second marker comprises a second marker portion provided closest to the at least one second region, and
   the first marker portion has a different color or luminance from the second marker portion.

16. The endoscopic image processing apparatus according to claim 15, wherein
   the at least one first marker further comprises a third marker portion provided further from at least one first region than the first marker portion,
   the at least one second marker comprises a fourth marker portion provided further from at least one second region than the third marker portion, and
   the third marker portion has a same color or luminance as the fourth marker portion.

17. The endoscopic image processing apparatus according to claim 1, wherein the at least one first marker is provided in all of the two or more first endoscopic regions to indicate the presence of the lesion region.

18. The endoscopic image processing apparatus according to claim 1, wherein a shape of one of the at least one first marker is the same a a shape of one of the at least one second marker.

19. The endoscopic image processing apparatus according to claim 1, wherein
   the at least on first marker comprises:
      a first marker portion provided closest to the at least one first region, and
      a second marker portion provided further from at least one first region than the first marker portion,
   the at least one second marker comprises:
      a third marker portion provided closest to the at least one second region, and
      a fourth marker portion provided further from at least one second region than the third marker portion,
   wherein the first marker portion has a different shape from the third marker portion, and
   the second marker portion has a same shape as the fourth marker portion.

* * * * *